(12) United States Patent
Schlattl et al.

(10) Patent No.: US 6,352,013 B1
(45) Date of Patent: Mar. 5, 2002

(54) BUTTER DISH

(75) Inventors: Alice Schlattl; Bettina Dichtl, both of Ruderting (DE)

(73) Assignee: Cetoni Umwelttechologie-Entwicklungs-GmbH (DE)

(*) Notice: Subject to any disclaimer, the term of this patent is extended or adjusted under 35 U.S.C. 154(b) by 0 days.

(21) Appl. No.: 09/525,129

(22) Filed: Mar. 14, 2000

(51) Int. Cl.⁷ .............................. B26D 1/25; B26D 7/27
(52) U.S. Cl. .................. 83/522.19; 83/417; 83/610; 83/648; 30/115; 30/124
(58) Field of Search .................. 83/522.11, 167, 83/437.1, 490, 491, 597, 932, 610, 648, 522.19, 417; 30/123, 124, 215, 115, 116

(56) References Cited

U.S. PATENT DOCUMENTS

| | | | | |
|---|---|---|---|---|
| 2,783,538 A | * | 3/1957 | Spevak ......................... | 30/116 |
| 4,513,501 A | * | 4/1985 | Lee .............................. | 30/115 |
| 4,697,488 A | * | 10/1987 | Cole ........................... | 83/437.2 |
| 5,621,972 A | * | 4/1997 | Sala ............................ | 30/116 |

* cited by examiner

*Primary Examiner*—Boyer Ashley
(74) *Attorney, Agent, or Firm*—Hoffman, Wasson & Gitler

(57) ABSTRACT

A butter dish for storing and dispensing specific sized slices of butter. The dish has two a base plates movable relative to each other and a removable lid pivotally connected to one of the base plates such that an interior space for holding a stick of butter is defined. The lid also includes a cutting edge opposite the pivotal connection for slicing the butter. The other one of the base plates includes a scale to indicate the size of the slice to be cut.

7 Claims, 4 Drawing Sheets

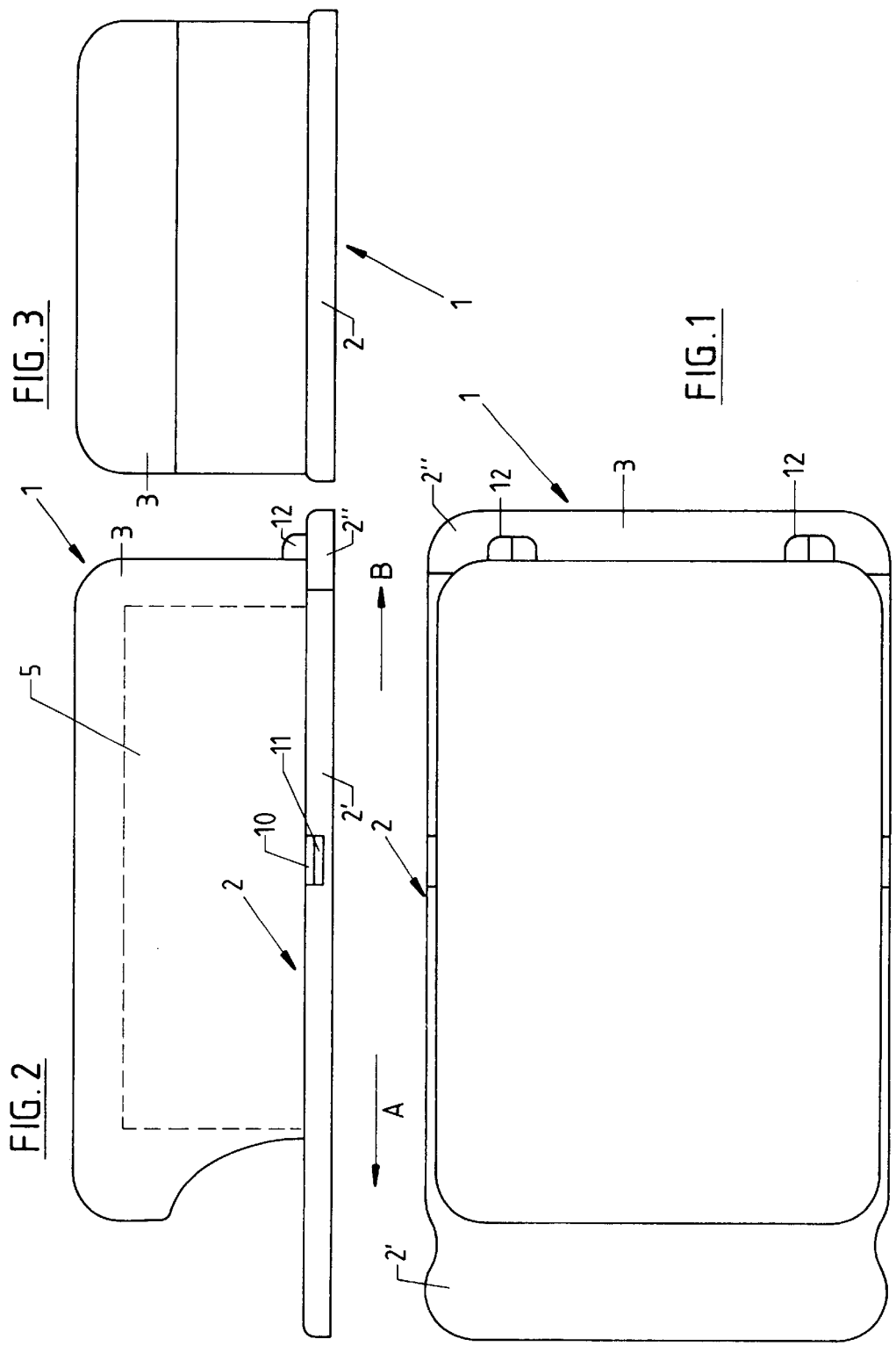

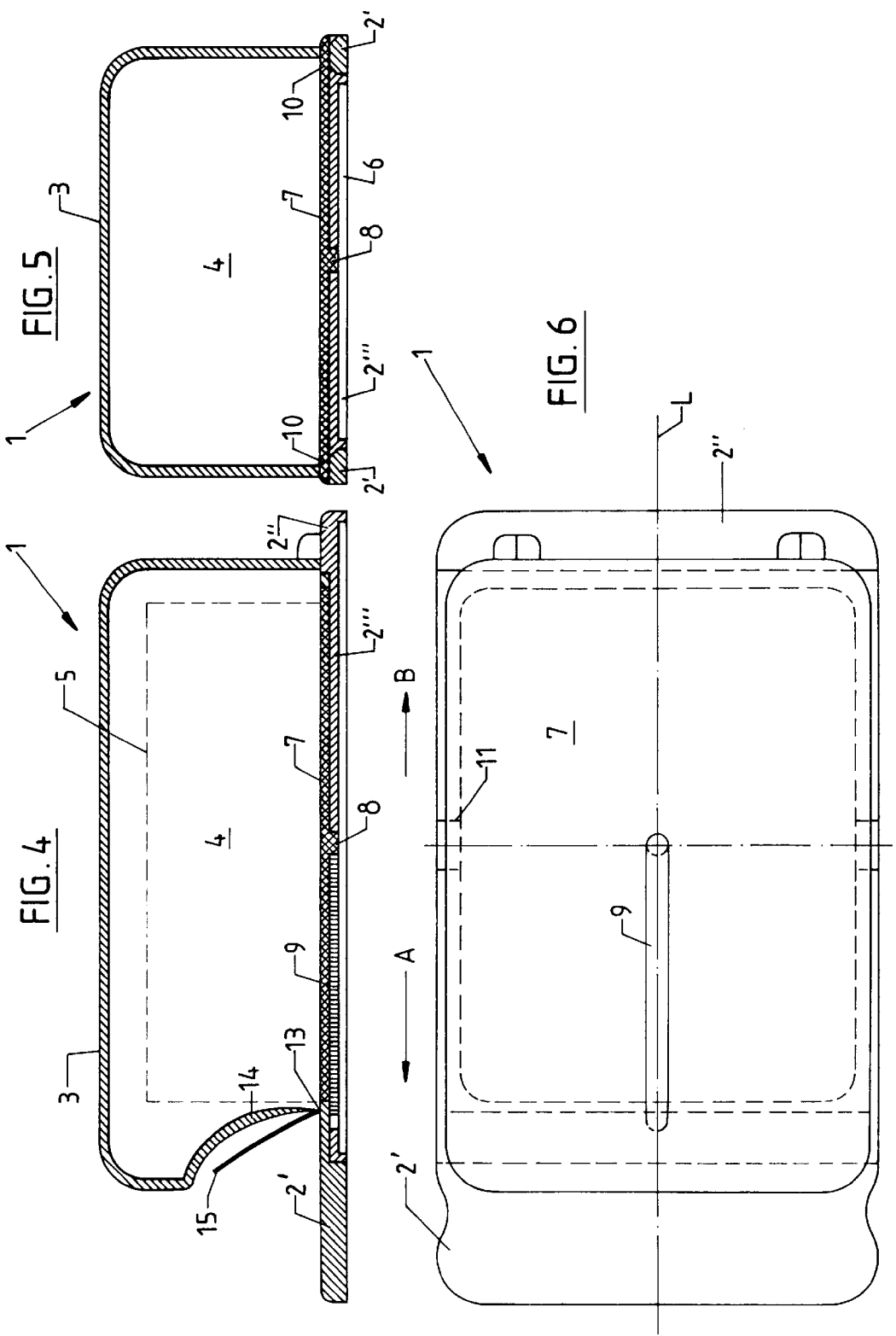

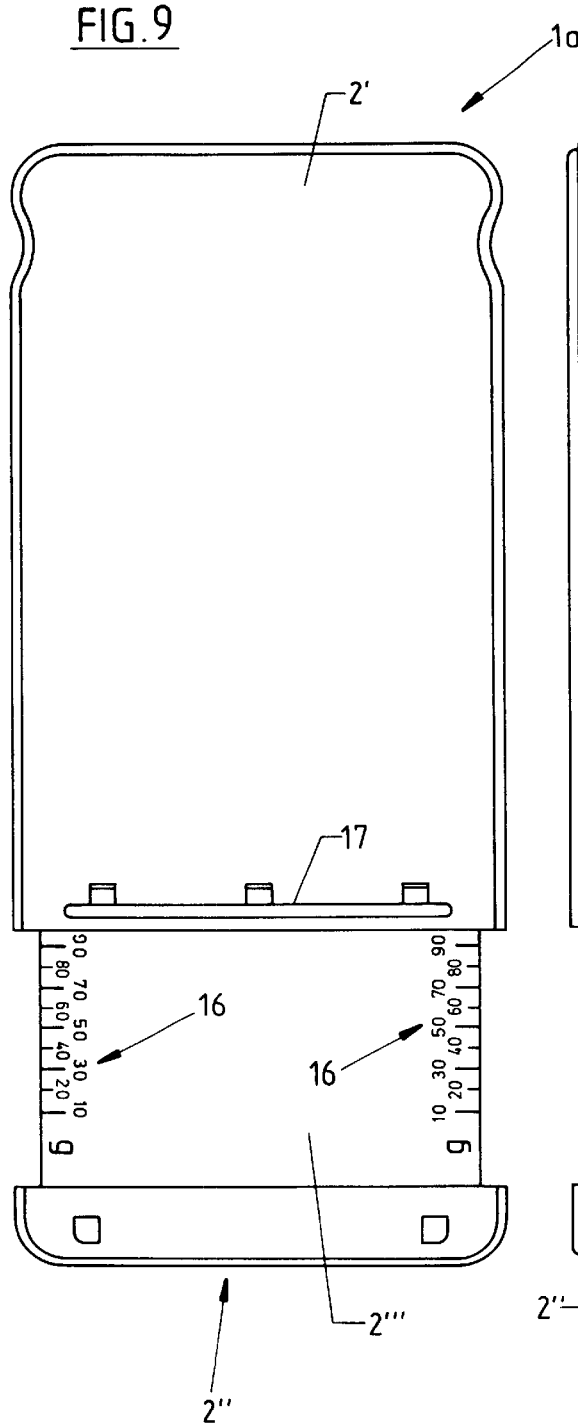
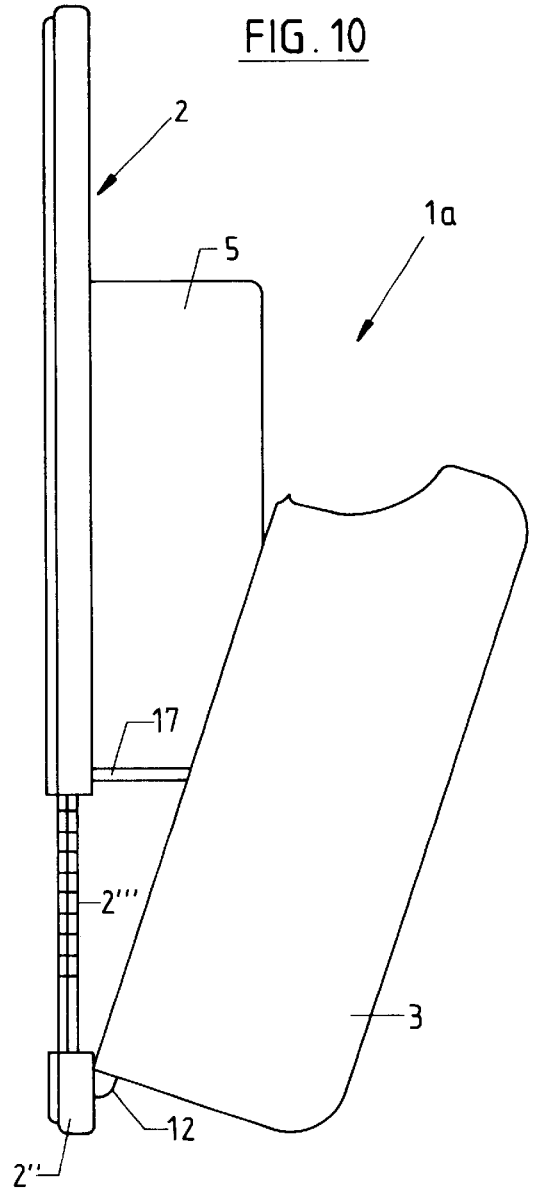

BUTTER DISH

BACKGROUND OF THE INVENTION

The invention pertains to a butter dish. The object of the invention is to present a butter dish that is also a simple means of portioning butter.

In order to solve this problem, a butter dish is presented.

SUMMARY OF THE INVENTION

For a butter dish according to the invention, the lid is provided with a cutting edge on at least one edge area, so that it is possible to cut off portioned slices of butter by lifting or swiveling the lid away from base plate forming the storage surface for the stick of butter and then lowering or swiveling the lid back onto the base plate.

The cutting edge or the knife can be manufactured as one piece with the lid, or connected with it permanently or as an exchangeable part. Suitable materials for the butter dish are plastic or metal, preferably stainless steel.

The invention makes possible wafer-thin "portioning" of slices of butter. The butter dispenser according to the invention functions with both hard and soft butter. Insofar as an exchangeable cutter or knife is used, a holder for storing a replacement blade can be provided for in the lid.

BRIEF DESCRIPTION OF THE DRAWINGS

The following invention is described in more detail with reference to a sample embodiment in the figures. These depict:

FIGS. 1–3 a butter dispenser designed as a butter dish according to the invention in top view, in side view and in front view;

FIG. 4 a longitudinal section through the butter dispenser of FIGS. 1–3;

FIG. 5 a cross section through the dispenser;

FIG. 6 a top view of the base plate of the dispenser, with the lid suggested;

FIGS. 9 and 10 in top view (with lid removed) and in side view, a further embodiment of the butter dispenser according to the invention.

DETAILED DESCRIPTION OF THE INVENTION

Figure 7:
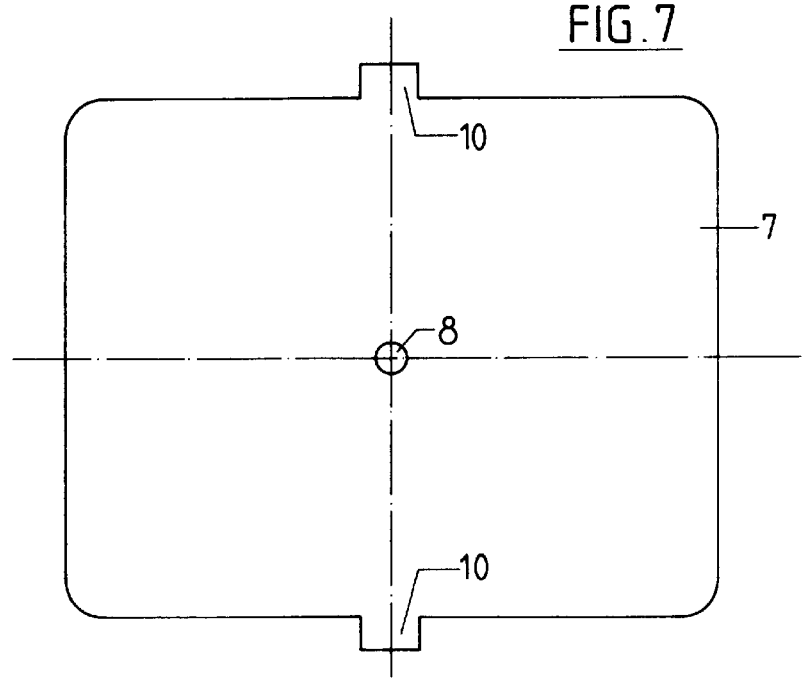
FIGS. 7 and 8 the removable tray of the movable element of the base plate in bottom view and in top view.
Figure 8:
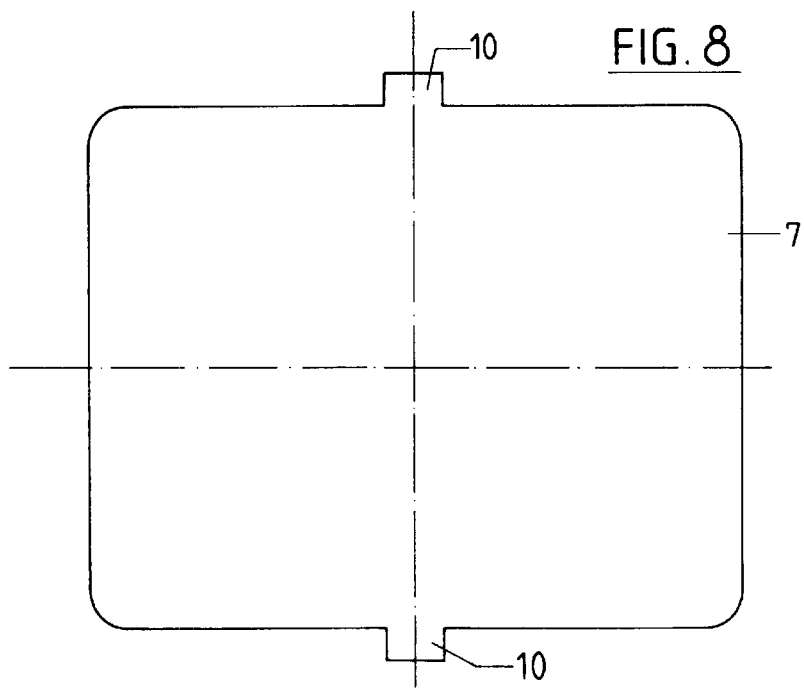

The butter dispenser depicted in the FIGS. 1–8, and generally referred to as 1, is designed in the manner of a butter dish and includes a bottom plate 2 and a cap-like lid 3, which when closed lies on the plate 2 with its open bottom side. The interior space 4 formed on the plate 2 and in the lid 3 serves for holding a stick of butter 5 with standard dimensions.

The plate 2 is formed of several parts, i.e. it includes first of all, two plate elements 2' and 2", which are movable in relation to each other in the longitudinal direction L of the essentially rectangular plate 2 and thus also in the longitudinal direction of the butter dispenser, by a distance that is at least equal to, but preferably larger than, half the length of the interior 4 in the direction of the longitudinal axis L. The plate element 2' forms the front of the dispenser 1 and the plate element 2" forms the back. The movability of the two plate elements 2' and 2" relative to each other is indicated by the arrows A and B. As shown especially in FIG. 5, the back plate element 2" fits in the plate element 2' with an integral section 2''' such that it engages surfaces of a recess 6 in the plate element 2' with a multiple dovetailed section located there. The plate element 2' is provided with a plate-like tray 7 that is inserted into an opening of the plate element 2' in such a way that after insertion the top of the tray 7 is even with the top of the two plate elements 2' and 2". The section 2''' of the back plate element 2" fitting in the recess 6 lies against the bottom of the tray 7. There, a peg-like projection 8 is integrated that engages in an elongated hole, the axis of which is identical to the longitudinal axis L and in which the section of the plate element 2" engaging in the recess 6 is located. With two lateral projections 10 the tray 7 engages in recesses 11 that are located on the top of the plate element 2'. This holds the tray 7 with a positive fit on the plate element 2'. The projection 8 engaging in the elongated hole 9 also limits the maximum distance of the relative movement between the plate elements 2' and 2". The length of the elongated hole 9 is at least equal to or larger than half the size of the interior 4 in the direction of the longitudinal axis L. In the depicted embodiment the essentially rectangular tray 7 has a width that is equal to the overall width of the interior 4 perpendicular to the longitudinal axis L and parallel to the plane of the plate 2. The length of the tray 7 is approximately the same as the size of the interior 4 in the direction of the longitudinal axis L.

The lid 3 can be swiveled on its back on the plate element 2' on an axis perpendicular to the longitudinal axis L and parallel to the planes of the plate 2, with the help of joints 12 that also enable the lid 3 to be removed from the plate 2, for example when the lid 3 is fully raised from the plate 2, in order to make it easier to clean the butter dispenser 1.

On the front, opposite the joints 12, the lid 3 is provided with a cutting edge 13 extending along the entire front or width of the lid 3. This cutting edge 13 is located on a wall section 14 of the lid 3 or on the front of this lid, which is shaped in such a way that when cutting off a slice of butter 15 from the stick of butter 5, this slice rolls in the manner depicted in FIG. 4 in order not to stick to the outer surface of the lid 3 or the wall section 14. In the depicted embodiment the wall section 14 is concave on its outer surface, on an imaginary axis that is perpendicular to the longitudinal axis L and parallel to the planes of the plate 2. Due to the concave wall section 14 the edge of the lid 3 is drawn inward on the front in the manner depicted in FIG. 4.

The butter dispenser 1 is used in such a way that when the plate elements 2' and 2" are pushed together and the tray 7 is located in the plate element 2", the stick of butter 5 is placed on the upper surface of the tray 7. By closing the lid 3 the butter can be stored in a suitable place, for example in the customary manner.

If a certain amount of butter is to be dispensed, the plate element 2' is moved forward (arrow A) a certain amount relative to the plate element 2" when the lid 3 is open, so that the stick of butter 5 comes to rest under the cutting edge 13 with its edge area adjacent to the wall section 14. By closing the lid 3 (swiveling on the axes of the joints 12) the slice of butter 15 is cut off from the stick of butter 5 by the cutting edge 13.

After cutting, the front plate element 2' is moved back to the starting position (arrow B), so that the butter dispenser 1 again has small dimensions for storage.

The maximum movement stroke of the plate element 2' relative to the plate element 2" is somewhat larger than half the size of the stick of butter 5 in the direction of the longitudinal axis L. Limiting the movement to this size ensures a stable design of the butter dispenser 1. In order to be able to cut the other half of the stick of butter 5 into portions in the manner described, the tray 7 is turned.

FIGS. 9 and 10 show as a further possible embodiment a butter dispenser la, which differs from the butter dispenser 1 only in that on the top of the section 2''' of the plate 2" a scale 16 is provided for that works together with the back edge of the plate element 2' and indicates the quantity or mass of the stick of butter or slice of butter 15 cut off.

In addition, a stop 17 is provided for on the top of the plate element 2' or on the storage surface for the stick of butter 5 formed there, enabling exact positioning of the stick of butter 5.

The invention has been described above with reference to sample embodiments. Of course, numerous alterations and adaptations are possible without abandoning the underlying inventive idea.

List of reference symbols 1 butter dispenser
2 plate
2', 2" plate element
2''' section
3 lid
4 interior
5 stick of butter
6 recess
7 tray
8 projection
9 elongated hole
10 projection
11 recess
12 joint
13 cutting edge
14 wall section
15 slice of butter
16 scale
17 stop

What is claimed is:

1. A butter dish comprising:

a base plate, a lid defining an interior space for holding a stick of butter, the base plate comprises two plate elements which are movable in relation to one another in a first axis, the first of said two plate elements having a surface for depositing the stick of butter, the second of the two plate elements forming pivot means for swiveling the lid on a first lid side about a second axis perpendicular to the first axis, the pivot means being such that the lid is removable from the second of the two plate elements, and the lid being provided with a cutting edge formed on an edge of the lid at a second lid side opposite to the first lid side.

2. The butter dish as claimed in claim 1, wherein the lid has a rectangular shaped structure, with two elongated sides and two narrow sides, said two narrow sides forming the first and second lid sides.

3. The butter dish as claimed in claim 1, wherein the base plate has a rectangular shaped structure, with two elongated sides and two narrow sides, said first axis being parallel to said elongated sides.

4. A butter dish as claimed in claim 1, wherein the first of the two plate elements being removable in relation to the second of the two plate elements.

5. The butter dish as claimed in claim 1, wherein the second lid side is formed by a curved wall section on the edge of which the cutting edge is located.

6. The butter dish as claimed in claim 1, wherein the dish is made of plastic, steel, or a combination thereof.

7. The butter dish as claimed in claim 1, further comprising a scale on one of said two plate elements forming the base plate for a metering butter.

* * * * *